No. 804,247. PATENTED NOV. 14, 1905.
C. L. MIEL.
STONE SAW.
APPLICATION FILED APR. 24, 1905.
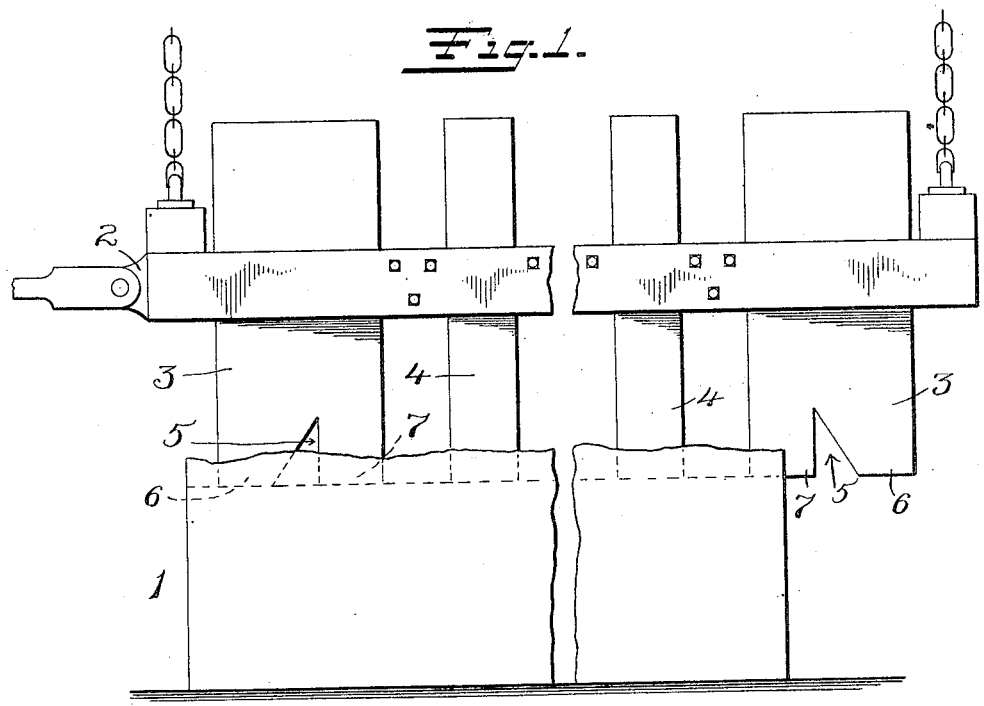
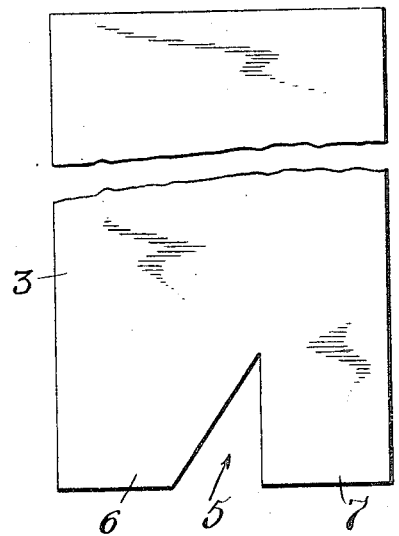
Witnesses
Inventor
Charles L. Miel
By his Attorneys

UNITED STATES PATENT OFFICE.

CHARLES L. MIEL, OF SACRAMENTO, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAW.

No. 804,247.      Specification of Letters Patent.      Patented Nov. 14, 1905.

Application filed April 24, 1905. Serial No. 257,260.

*To all whom it may concern:*

Be it known that I, CHARLES L. MIEL, a citizen of the United States, residing at Sacramento, Sacramento county, California, have invented certain new and useful Improvements in Stone-Saws, of which the following is a full, clear, and exact description.

My invention relates to improvements in stone-saws, and particularly to the end blades. These saws comprise a series of vertical blades carried by a longitudinally-movable beam and adapted to coact with loose abrasive material for effecting the cut in the rock.

It is my object to improve the end plates so as to effect a better cutting operation, but without permitting the end blades to entirely leave the rock in the extreme positions. This prevents buckling or wabbling of the blade, and consequent possibility of injury to the blades as well as to the stone which is being cut.

The invention consists in the employment of unusually broad end blades having a portion of the lower edge cut away so as to form two relatively shorter bearing-surfaces, which improves the abrasive action without materially affecting the strength of the blade.

In the drawings, Figure 1 is a side elevation of a stone-saw with blades embodying the improvements of my invention, a portion only of the two ends of the saw being shown. Fig. 2 is a view, on a larger scale, of a single blade embodying the improvements of my invention.

1 represents the rock which it is desired to cut. Suitable abrasive material is applied along the line of work and then pressure applied by means of a saw.

2 is the saw-beam, provided with any suitable means for producing longitudinal movement and any suitable means of support for raising the same.

3 3 are the end blades carried by the saw-beam. 4 4 are intermediate blades. The intermediate blades may be provided in any suitable number, depending upon the desired length of the saw for the operation at hand.

The blades are all formed of suitable steel of sufficient strength and of such dimension as is necessary.

The end blades are much wider than the intermediate blades and so proportioned relative to the longitudinal stroke of the saw that the blades never entirely leave the body of the stone when the cut is once started. Therefore there is no danger of the end blades being displaced on the return movement.

In the lower edge of the end plate I cut a notch 5, preferably having one edge vertical and the other inclined toward the outer edge of the plate, thus dividing the bearing-surface of the blade into two portions 6 and 7. The effect, therefore, of narrow blades and the consequent more frequent stirring up of the abrasive material is produced. The cut 5 is, however, not of sufficient size to materially affect the strength of the blade, so that I substantially preserve the advantages of a very broad end blade.

While I do not intend to have it inferred that my invention is limited to such dimensions, I will give suitable proportions for a plate as width thirty inches, having a notch with bearing edge 6 of ten inches, edge 7 of twelve inches, and vertical depth of the notch 5 of twelve inches.

What I claim is—

1. In a stone-saw, a beam, a series of independent vertically-disposed saw-blades carried thereby and spaced apart from each other, the end blades being broader than the intermediate blades and having notches in their bearing edges dividing the bearing edges into a plurality of surfaces, for the purpose specified.

2. In a stone-saw, a broad vertically-arranged plate-like blade and having a notch in its lower edge leaving two straight bearing edges, one of the walls of the notch being substantially vertical and the other wall inclined.

CHARLES L. MIEL.

Witnesses:
L. VREELAND,
R. C. MITCHELL.